United States Patent [19]
Cedrone et al.

[11] Patent Number: 5,208,889
[45] Date of Patent: May 4, 1993

[54] OPTICAL FIBER RIBBON CABLE AND ASSEMBLY THEREOF WITH A CONNECTOR

[75] Inventors: Alfredo L. Cedrone, Austin; Brian K. Lloyd, Pflugerville, both of Tex.

[73] Assignee: W. L. Gore & Associates, Inc., Newark, Del.

[21] Appl. No.: 782,224

[22] Filed: Oct. 24, 1991

[51] Int. Cl.$^5$ .............................................. G02B 6/44
[52] U.S. Cl. .................................. 385/114; 385/106; 385/112
[58] Field of Search ................. 385/114, 106, 112, 102

[56] References Cited

U.S. PATENT DOCUMENTS

| | | | |
|---|---|---|---|
| 3,920,432 | 11/1975 | Smith | 385/114 X |
| 4,443,657 | 4/1984 | Hill et al. | 385/114 X |
| 4,676,591 | 6/1987 | Driskel | 385/114 |
| 4,752,112 | 6/1988 | Mayr | 385/114 |
| 4,848,868 | 7/1989 | Rohner | 385/114 |
| 4,861,135 | 8/1989 | Rohner et al. | 385/114 |
| 4,900,126 | 2/1990 | Jackson et al. | 385/114 |

Primary Examiner—John D. Lee
Assistant Examiner—Phan Thi Heartney
Attorney, Agent, or Firm—Gary A. Samuels

[57] ABSTRACT

An optical fiber ribbon cable having a specified space between the first and second optical fibers, a guide piece to fit onto the cable against the web of jacket between the first two optical fibers, and an assembly of the cable and guide piece with an optical fiber connector to supply accuracy and predictability of dimensions for assembly of optical fiber cables to connectors of close dimensional tolerances.

6 Claims, 2 Drawing Sheets

OPTICAL FIBER RIBBON CABLE AND ASSEMBLY THEREOF WITH A CONNECTOR

FIELD OF THE INVENTION

The invention pertains to optical fiber ribbon cables having precisely aligned and oriented optical fibers therein for termination to a connector having close tolerance termination requirements.

BACKGROUND OF THE INVENTION

In the field of optical fiber cables, the mating thereof to very precise connectors having very close dimensional tolerances renders it increasingly difficult to manufacture optical fiber cables to the dimensional precision required for termination to those connectors. The invention provides optical fiber ribbon cables having precisely spaced optical fibers which can meet the dimensional tolerances required for termination to such connectors.

SUMMARY OF THE INVENTION

The invention comprises an optical fiber ribbon cable in which a multiplicity of optical fibers are cabled together within a jacket of dielectric material at precise distances apart, there being at least one optical fiber width space between an edge fiber and the next adjacent fiber, preferably two fiber widths space therebetween. The first optical fiber from the edge of cable is positioned in a location within the cable such that the other optical fibers can be easily and precisely positioned in the cable with reference to the first fiber.

By separating the first and second optical fibers from each other by at least one and preferably two center-to-center spacing units (such as 0.01 inch per unit), in the form of a groove, the cable with the aid of one or two, upper and/or lower, guide pieces can track the groove into a connector to position the cable correctly and precisely in the connector for termination of the individual optical fibers.

The guide pieces are in the form of small flat molded polymer pieces of about the width of the cable which have a protruberance or ridge molded accurately into one side to exactly match the groove in the cable between the first and second optical fibers. One or two guide pieces are laid on the top and/or bottom of the cable end and together the guide pieces and cable inserted as a unit into an optical fiber connector.

The optical fiber ribon cables of the invention are manufactured by standard cabling techniques used in the cabling art. The optical fibers used therein are those known to be useful in the art, made of glass or plastic, coated or uncoated, and covered or not covered by buffering layers of soft or hard materials. A high-temperature embodiment of the cable may be formed of sheets of unsintered PTFE or unsintered expanded PTFE around the optical fibers and the PTFE sintered at the end of the cabling process. The sheathing of the cable which holds the optical fibers in position precisely spaced apart from each other may be porous expanded polytetrafluoroethylene (PTFE) coated with a thermoplastic polyester to seal and hold the PTFE layers together at the edges of the cable or in between the optical fibers in the form of webs between the fibers. The expanded PTFE useful in the invention is that disclosed in U.S. Pat. Nos. 3,953,566, 3,962,153, 4,096,227 and 4,187,390. Other equivalent materials of similar insulation properties to the above preferred PTFE materials may also be utilized. The guide pieces may be any commonly useful moldable thermoplastic insulation material or thermosetting insulation material if needed for a high-temperature resistant cable.

DETAILED DESCRIPTION OF THE INVENTION

The invention is now described, but not limited, by reference to the drawings to more carefully delineate the scope of the invention which will be described by the appended claims.

Figure 1:
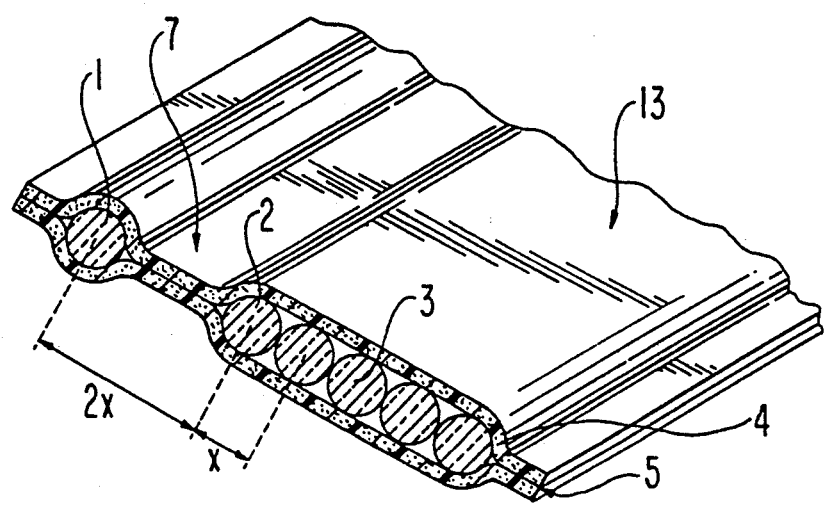
FIG. 1 is a partial cross-sectional perspective view of a cable of the invention.
Figure 2:
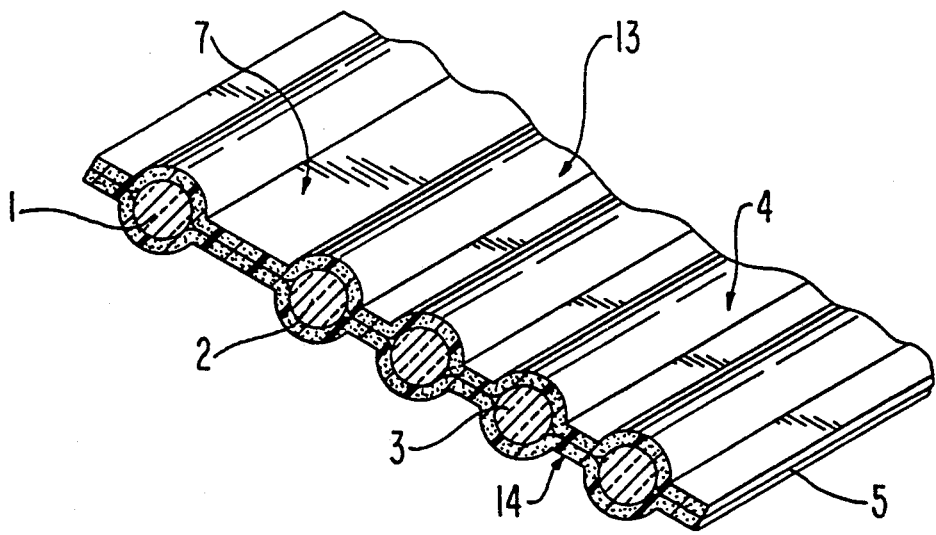
FIG. 2 is a cross-sectional perspective view of a cable of the invention having the optical fibers therein separated by webs of insulation.

FIG. 1 shows a partial perspective view of a portion of ribbon cable 13 of the invention in which one optical fiber 1 near an edge of ribbon cable 13 is separated by web 7 within the polymeric insulation 4 by at least one fiber diameter, preferably at least two fiber diameters from the second or next adjacent optical fiber 2. The remaining optical fibers 3 of ribbon cable 13 may be adjacent each other without intervening webs of insulation. As shown in FIG. 2, there may be intervening webs 14 of insulation separating the optical fibers 2 and 3 from each other at carefully controlled distances apart. Web 7 of insulation separates and holds in place optical fibers 1 and 2 at the specified one or two fiber width distance apart.

Cable 13 is manufactured by well-known cabling methods used in cabling electric signal conductors and fiber optic cables together into flat ribbon cables. In this invention, insulation 4 is preferably made from sheets of the porous expanded PTFE described above which have on one surface an adhesive layer of thermoplastic polyester for easy adherance of two layers of expanded PTFE to each other around the optical fibers 3 of the cable in the cabling process. This method allows close dimensional control of the spacing of the optical fibers within the cable during and after the process.

Where a high temperature cable is being made the insulation may be sheets of PTFE insulation extruded from emulsion prepared fine PTFE powder particles which are placed around the optical fibers by the cabling process and the resulting ribbon cable heated in a salt bath or sintering oven for the requisite time at a temperature to fully sinter the PTFE to full-density PTFE insulation.

Figure 3:
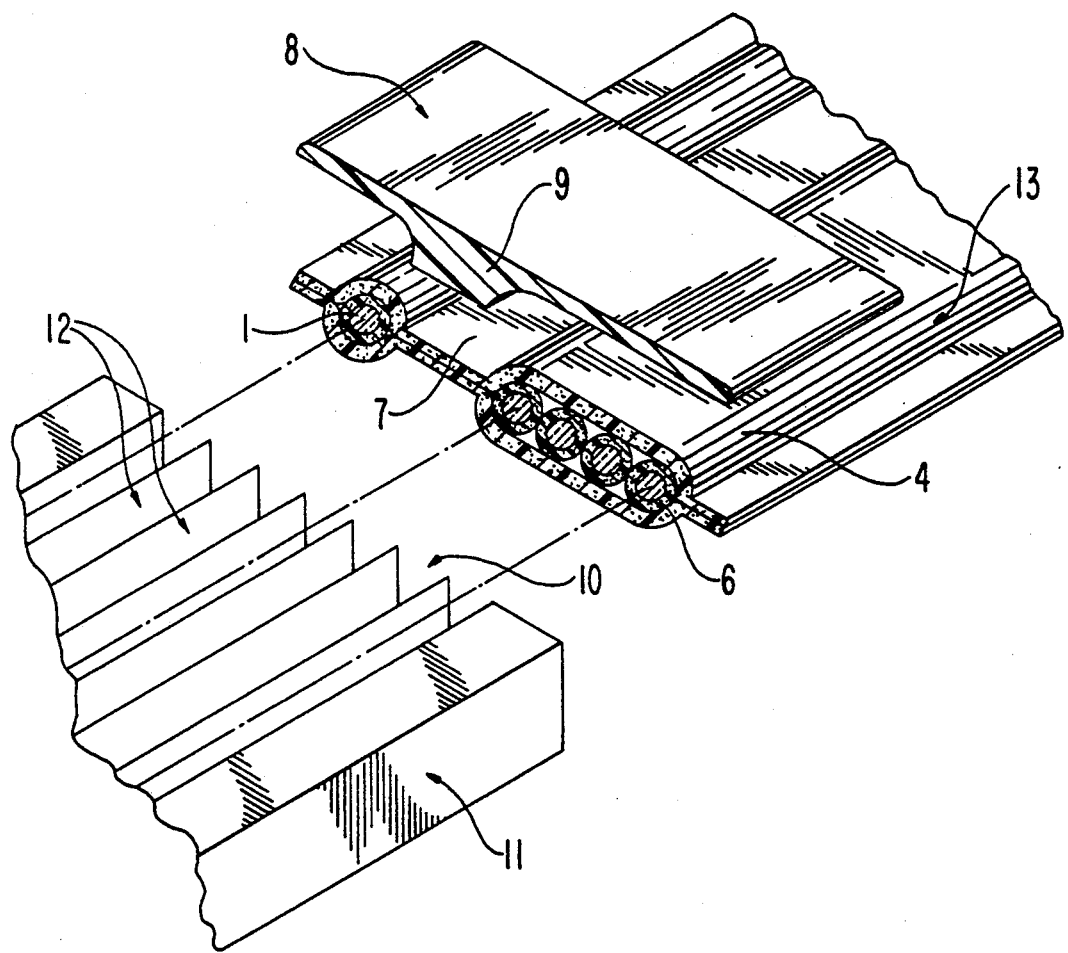
FIG. 3 is an exploded partial cross-sectional view of an assembly of the cable of the invention with a guide piece and a connector.

In the cabling process, optical fiber 1 is carefully spaced at preferably two optical fiber diameters from the second or next adjacent optical fiber 2 so that the spacing of fiber 2 and the remaining optical fibers 3 such that a known spacing between fibers 1, 2, and 3 is achieved and maintained within the cable with fiber 1 being the reference fiber for that spacing. Such carefully controlled spacing between optical fibers is necessary to match the termination grooves of more modern optical fiber connectors for accurate termination to those connectors. As shown in FIG. 3, the second and third grooves of the connector remain empty to correspond to the gap of controlled size between fibes 1 and 2 of cable 13.

To aid in maintaining the required spacing while cable termination is being performed, a guide piece 8 is placed either above or below or both above and below the end of cable 13. The guide piece 8 is relatively short and corresponds to the length of cable which is to be inserted in connector 11 as shown in FIG. 3. The grooves 12 in connector 11 aid in maintaining the spacing in the connector of the optical fibers of the cable. A protruding portion 9 of guide piece 8 fits down into web 7 when guide piece 8 is placed in abutment with cable 13 for insertion into connector 11. A cover (not shown) fits over cable 13 and guide piece 8 to hold them in the completely assembled connector. The cable 13 and guide piece 8 when fully assembled to connector 11 form an assembly of the invention. The guide piece may be manufactured from any moldable plastic dielectric material, usually a thermoplastic polymer being preferred for convenience and ease of manufacture.

The cable 13, the guide piece 8 provide a simple easy to assemble means to overcome the spacing problems and supply the needs for accuracy and predictability of dimensions for assembly of optical fiber cables to modern connectors having close dimensional tolerances.

We claim:
1. An assembly comprising:
(a) an optical fiber ribbon connector terminated to;
(b) a flat optical fiber ribbon cable comprising:
  (i) a multiplicity of parallel optical fibers cabled together adjacent each other at precise distances apart and spaced from an adjacent reference edge of said cable within a jacket of dielectric material;
  (ii) the first optical fiber adjacent said reference edge of said cable being spaced one or more optical fiber diameters from the next adjacent optical fiber of the cable; and
  (iii) the next adjacent and remaining optical fibers of said cable being positioned a known distance from said first optical fiber as referenced by a web formed from said dielectric material of said jacket; and
(c) a molded dielectric polymer guide piece configured on one side to fit into the space between said first and said adjacent optical fibers against said web of insulation linking said fibers, said guide piece positioned on said flat optical fiber ribbon cable at the aforementioned space.

2. A cable of claim 1 wherein said jacket material comprises polytetrafluoroethylene.

3. A cable of claim 2 wherein said polytetrafluoroethylene comprises expanded polytetrafluoroethylene.

4. A cable of claim 3 wherein said jacket material comprises two sheets of expanded polytetrafluoroethylene, having an adhesive coating thereon, which are bonded together around said optical fibers.

5. A cable of claim 7 wherein said adhesive comprises thermoplastic polyester.

6. A cable of claim 1 wherein said optical fibers are coated with protective layers.

* * * * *